March 27, 1956  J. G. JOHNSON  2,739,495
BORING BAR UNIT

Filed Jan. 13, 1953  2 Sheets-Sheet 1

INVENTOR
Jacob G. Johnson
BY
ATTORNEYS

March 27, 1956 J. G. JOHNSON 2,739,495
BORING BAR UNIT
Filed Jan. 13, 1953 2 Sheets-Sheet 2

INVENTOR
Jacob G. Johnson
BY
ATTORNEYS

United States Patent Office 2,739,495
Patented Mar. 27, 1956

2,739,495

BORING BAR UNIT

Jacob G. Johnson, Gilroy, Calif., assignor, by mesne assignments, to Be-Ge Manufacturing Co., Gilroy, Calif., a corporation of California Application January 13, 1953, Serial No. 331,018

3 Claims. (Cl. 77—3)

This invention relates in general to improvements in lathe mounted boring bars.

In particular the invention is directed to, and it is a major object to provide, a novel boring bar unit operative to readily and accurately cut a shaped or contoured bore in tubular work, such as a gun barrel, chucked in a lathe, or similar machine.

Another important object of the present invention is to provide a boring bar unit, for the purpose described, wherein the boring bar carries a radially adjustable cutting tool to cut the bore of the work and into which bore the bar projects; there being a contoured template mounted on the lathe exteriorly of the work; novel mechanism being provided between such template and tool operative to cause the latter to automatically follow the contour of said template as the boring bar advances, whereby to machine the bore in the work in matching relationship to said contour.

An additional object of this invention is to provide a boring bar unit, as in the preceding paragraph, wherein said mechanism includes, with a longitudinal rotary shaft carried inside the boring bar, a rack and pinion assembly between the template and shaft exteriorly of the work, and a separate rack and pinion assembly between the shaft and cutting tool within the boring bar. Such rack and pinion assemblies are operative to translate the contour of the template into rotary motion of the shaft, and to then retranslate such rotary motion into radial motion of said cutting tool so that the latter then cuts the bore to the contour of the template.

A separate object of this invention is to provide a boring bar unit, and actuating mechanism therefor, which is adapted to be mounted on a conventional type lathe; the tubular work being secured in and rotated by the chuck, and the boring bar, together with a related portion of the actuating mechanism, being mounted on and advanced by the carriage of the lathe.

A further object of the instant invention is to provide a boring bar unit of the type described which is supported interiorly of the tubular work by a pilot bearing disposed beyond the cutting tool, whereby to stabilize and properly center said bar in the work.

It is also an object of the invention to provide a boring bar unit which is practical and reliable for the intended purpose.

These objects are accomplished by means of such structure and relative arrangement of parts as will fully appear by a perusal of the following specification and claims:

Figure 1:
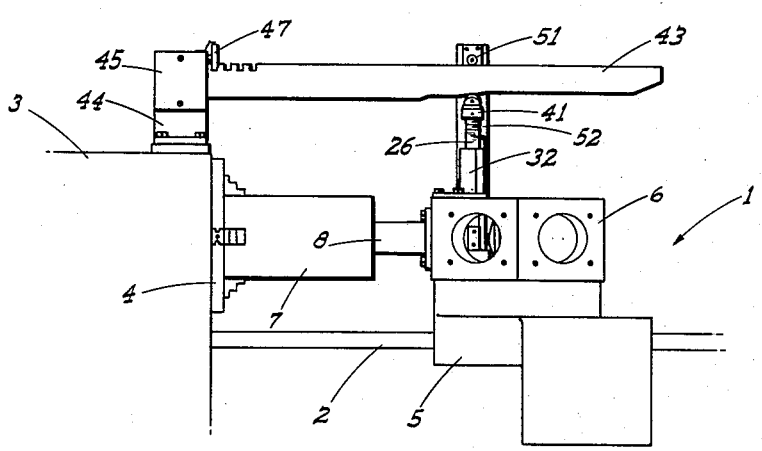
Fig. 1 is a side elevation of the boring bar unit as mounted on a turret lathe; the latter being shown diagrammatically and only in part.
Figure 4:
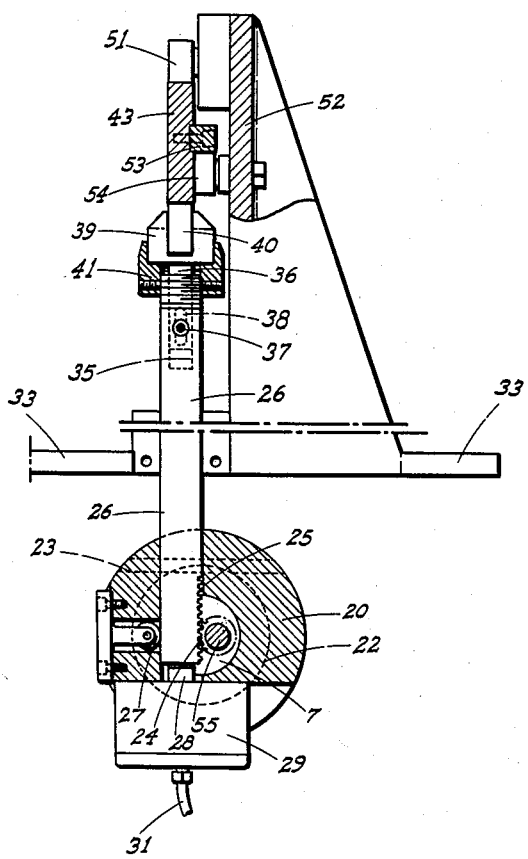
Fig. 4 is a vertical transverse section on line 4—4 of Fig. 2.
Figure 5:
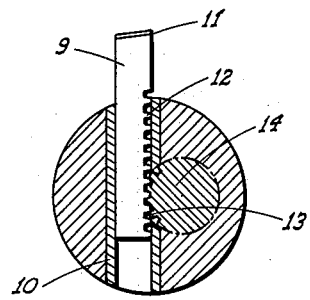
Fig. 5 is an enlarged fragmentary transverse section on line 5—5 of Fig. 3.
Figure 2:
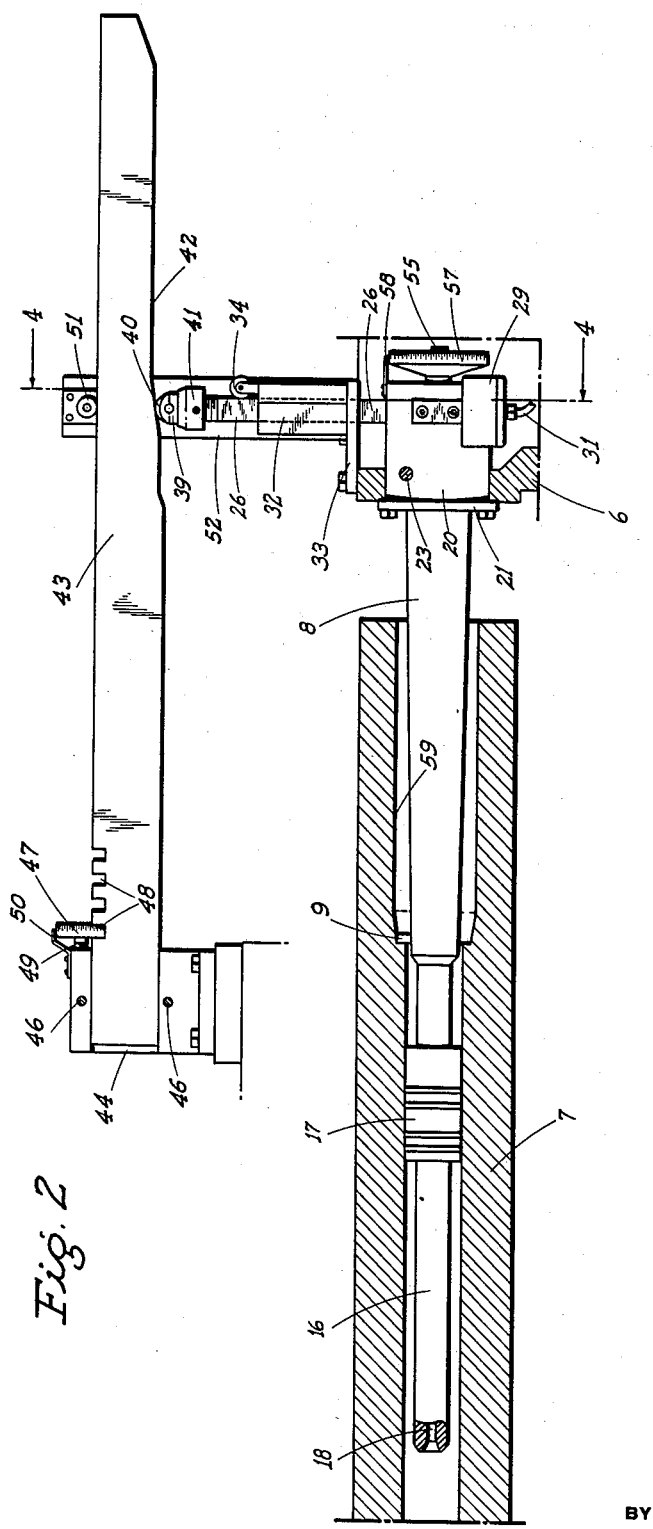
Fig. 2 is an enlarged side elevation of the boring bar unit, but with the tubular work and the turret in section.
Figure 3:
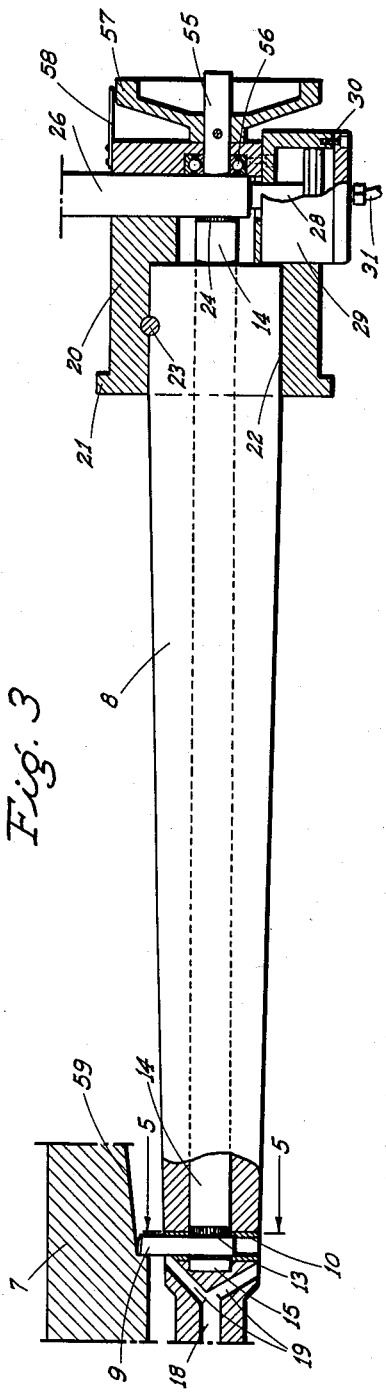
Fig. 3 is an enlarged fragmentary elevation, partly in section, of the boring bar, its mount, and actuating mechanism.

Referring now more particularly to the characters of reference on the drawings, the numeral 1 indicates generally a turret lathe, which lathe includes a bed 2, a headstock 3, a driven rotary chuck 4 on the headstock 3, and a power advanced carriage 5 which supports a turret 6.

The tubular work, such as a gun barrel or the like which is to be contour machined interiorly, is indicated at 7; such tubular work being secured in the chuck 4 for rotation by the latter.

A longitudinally extending boring bar 8 is secured at its rear end to the turret 6 in the manner hereinafter described, and thence projects toward and into the tubular work 7. The boring bar 8 carries, intermediate its ends, a radially adjustable cutting tool 9 which slides in the boring bar in a bushing 10; one end of the cutting tool 9 projecting out of the boring bar and being formed with a cutting edge 11.

The cutting tool 9 is adapted to be adjusted in or out by means of a rack 12 on said tool running in mesh with a pinion 13 formed on a longitudinal actuating shaft 14 journaled within the boring bar 8 and extending from adjacent the cutting tool 9 to projection from the rear end of said boring bar. Ahead of the cutting tool 9 the shaft 14 is carried in a bushing 15. With this arrangement, rotation of the shaft 14 in one direction radially retracts the cutting tool 9, while rotation in the opposite direction radially advances such tool. It is to be noted that the shaft 14 is offset in the boring bar 8 so that the cutting edge 11 may be disposed directly radially from said boring bar 8.

Forwardly of the cutting tool 9 the boring bar 8 is of reduced diameter; the reduced-diameter portion being indicated at 16, and such portion being carried in a pilot bearing 17 disposed in the tubular work 7 at a point ahead of the area to be machined.

The cutting tool 9 is cooled and lubricated by a liquid coolant pumped into the forward end of the tubular work 7 by means not here shown; such coolant flowing through a bore 18 in the forward, reduced-diameter portion 16 of the boring bar 8. The bore 18 forks at its rear end, as at 19, and delivers the coolant out of the boring bar on opposite sides thereof at a point immediately ahead of the cutting tool 9. The coolant also flows through and around pilot bearing 17, thereby washing shavings and chips out of the bore.

The mount between the boring bar 8 and the turret 6 comprises a heavy-duty, cylindrical body 20 engaged in the turret through one of the turret openings and secured in place by a mounting plate 21 bolted to the face of the turret, as shown.

The cylindrical body 20 includes a forwardly opening socket 22 into which the rear end of the boring bar 8 engages in close fitting relation; the bar being removably held in the socket by a locking pin 23. The actuating shaft 14 projects from the boring bar 8 rearwardly of the socket 22, and is there formed with a pinion 24 which runs in mesh with a rack 25 on the lower end of a vertical plunger 26 which extends upwardly in guided relation through the cylindrical body 20, thence continuing to an upper end termination some distance above said body. To assure constant mesh of the pinion 24 and rack 25, the latter is engaged directly opposite said pinion by a guide roller 27.

The plunger 26 is constantly but yieldably urged upwardly by the vertical piston rod 28 of a fluid pressure actuated power cylinder 29 mounted on the under side of the body 20, with said piston rod projecting upwardly into abutment with the lower end of said plunger. The cylinder 29 includes a piston 30, and said cylinder is fed fluid pressure from below by means including a conduit 31.

Above the cylindrical body 20 the plunger 26 is carried in a guide sleeve 32 fixed to the top of the turret 6 by means of a horizontal attachment plate 33. The upper end of the guide sleeve 32 carries a thrust roller 34 which bears against the back side of the plunger 26; such plunger being non-circular in cross section in order to prevent its turning within the guide sleeve 32.

At its upper end the plunger 26 is formed with a vertical, upwardly opening bore 35 in which a stem 36 is vertically adjustably disposed, and prevented against rotation by a set screw 37 engaging in a groove 38 in said stem.

At its upper end the stem 36 is formed with a head 39 which carries a transverse axis roller 40 which serves as a cam follower, as will hereinafter appear.

Vertical adjustment of the stem 36, head 39, and roller 40 as a unit is accomplished by an adjustment cup 41 threaded on the upper end of the plunger 26 and normally fixed against turning by set screws, as shown; cup 41 thus micro-adjusting for bore size.

The cam follower roller 40 normally engages a lower, contoured or cam edge 42 formed on a longitudinal cam bar or template 43 which extends horizontally above the turret 6, such cam edge 42 being precut to the exact shape or contour which is desired to machine in the tubular work 7.

At its forward end the longitudinal template 43 is fixed in connection with the headstock 3, but for longitudinal adjustment, in the following manner:

The forward end portion of the template 43 engages in initially slidable relation through a mounting block 44 fixed on and upstanding from the headstock 3. The mounting block 44 includes a holding and clamping plate 45 which—when tightened by screws 46—prevents longitudinal movement of the template 43.

To accomplish a longitudinal adjustment of the template 43 the plate 45 is first loosened, and then a longitudinal axis adjustment wheel 47 which seats in one of a plurality of notches 48 in the template 43 is rotated one way or the other to accomplish the desired adjustment.

The wheel 47 includes a spindle 49 threaded into the mounting block 44, as shown; such wheel being calibrated about its circumference and a pointer 50 reading thereon.

The template 43 is engaged on its upper edge by a hold-down roller 51 carried on a post 52 which upstands from the turret 6. Additionally, the template 43 carries, on the back side, a longitudinal back rail 53 which rests on a supporting roller 54 likewise secured in connection with the post 52. The roller 51 assures against upward deflection of the template 43, while the roller 54 prevents downward deflection thereof.

Rearwardly of the pinion 24 on shaft 14, said shaft is formed with a rearward extension 55 journaled, intermediate its ends, in a ball bearing 56; such extension being fitted with an adjustment wheel 57 calibrated on the circumference, and on which a pointer 58 reads.

The adjustment wheel 47 is used to exactly position the template 43 with respect to the position of the tubular work 7 in the chuck 4, while the adjustment wheel 57 is employed to impart a rough initial setting of the cutting tool 9, while the final accurate adjustment of the latter is obtained by turning cup 41.

In operation of the above described boring bar unit, the boring bar 8 is advanced into the tubular work 7 for the purpose of cutting or machining a bore 59 having a predetermined contour matching that of the cam edge 42.

As the turret 6 is advanced by the carriage 5, with the tubular work 7 turning about the boring bar 8 and cutting tool 9, the cam follower roller 40 runs along the cam edge 42, working the plunger 26 up and down in response to the contour of said edge. Such motion of the plunger 26 is translated by the rack 25 and pinion 24 into corresponding rotary motion of the shaft 14, and such motion, through the medium of the pinion 13 and rack 12, is re-translated into radial motion of the cutting tool 9. The result is that the cutting tool 9 accurately machines the bore 59 in exact matching relation to the cam edge 42 of the template 43 as the boring bar 8 runs into the tubular work 7. The pilot bearing 17 assures that the boring bar 8 does not have any radial deflection during the contour machining of the bore 59.

The fluid pressure actuated power cylinder 29, working yieldably against the lower end of the plunger 26, maintains effective contact at all times of the cam follower roller 40 with the cam edge 42, so that no inaccuracies can result from such point of contact.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as being new and useful, and upon which Letters Patent are desired:

1. In a boring bar unit for a lathe, said unit including a non-rotatable boring bar having a laterally adjustable cutting tool, means mounting the bar at its outer end for longitudinal movement with said mounting means, and a plunger slidably mounted and projecting from the mounting means and arranged to shift the tool laterally upon sliding movement of the plunger; a longitudinal template mounted on the lathe and having a cam surface along one horizontal edge, a follower on the plunger engaging said cam surface, means to adjust the follower on the plunger lengthwise thereof, the follower comprising a roller and said last named means comprising a head in which the roller is mounted, a stem projecting from the head and slidably but non-turnably mounted in the outer end of the plunger, the head and the outer end portion of the plunger being circular in section, and a cup in which the head is seated in relatively turnable relation; the cup being threaded on said circular portion of the plunger.

2. In a boring bar unit for a lathe, said unit including a non-rotatable boring bar having a laterally adjustable cutting tool, means mounting the bar at its outer end for longitudinal movement with said mounting means, and a plunger slidably mounted and projecting from the mounting means and arranged to shift the tool laterally upon sliding movement of the plunger; a longitudinal template mounted on the lathe and having a cam surface along one horizontal edge, a follower on the plunger engaging said cam surface, and means to longitudinally adjust the template; said means comprising a block fixed on the lathe and in which one end of the template is slidable, one longitudinal edge of the template having a notch cut therein adjacent the block, a wheel substantially the width of and projecting into the notch, and a spindle axially of the wheel parallel to the direction of sliding movement of the template, said spindle being adjustably threaded into the block.

3. A unit as in claim 2, with other wheel-receiving notches in said edge of the template in relatively closely spaced relation to each other and to the first named notch.

References Cited in the file of this patent

UNITED STATES PATENTS

| 887,310 | Chamberlin | May 12, 1908 |
| 1,933,224 | Smith | Oct. 31, 1933 |
| 2,401,422 | Hamilton | June 4, 1946 |

FOREIGN PATENTS

| 102,911 | Great Britain | Jan. 4, 1917 |
| 526,073 | Great Britain | Sept. 10, 1940 |